Oct. 24, 1933.     A. BREZOVITZ     1,931,526
DUMP BODY FOR VEHICLES
Filed Oct. 13, 1930     5 Sheets-Sheet 1
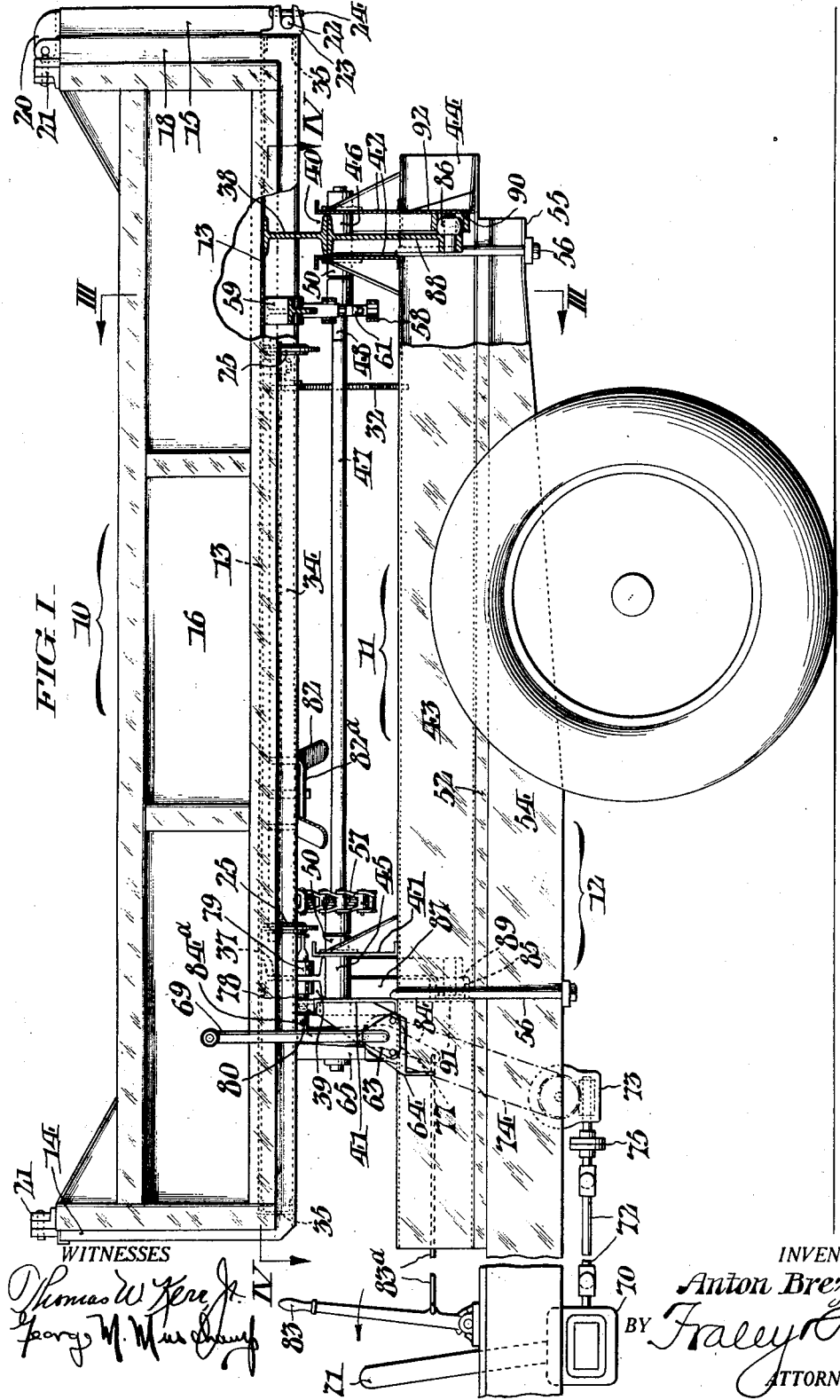
WITNESSES
INVENTOR:
Anton Brezovitz,
BY
ATTORNEYS.

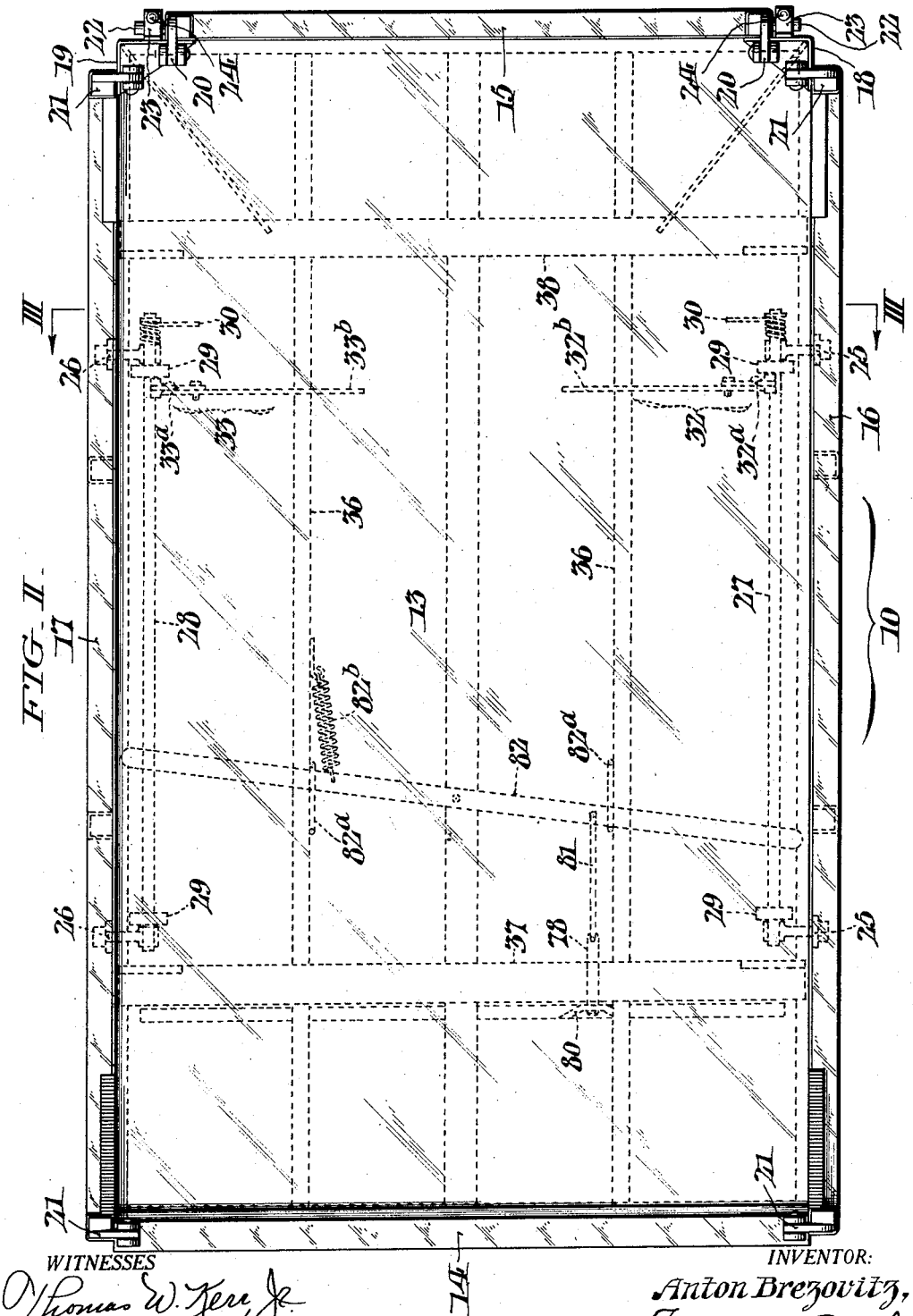

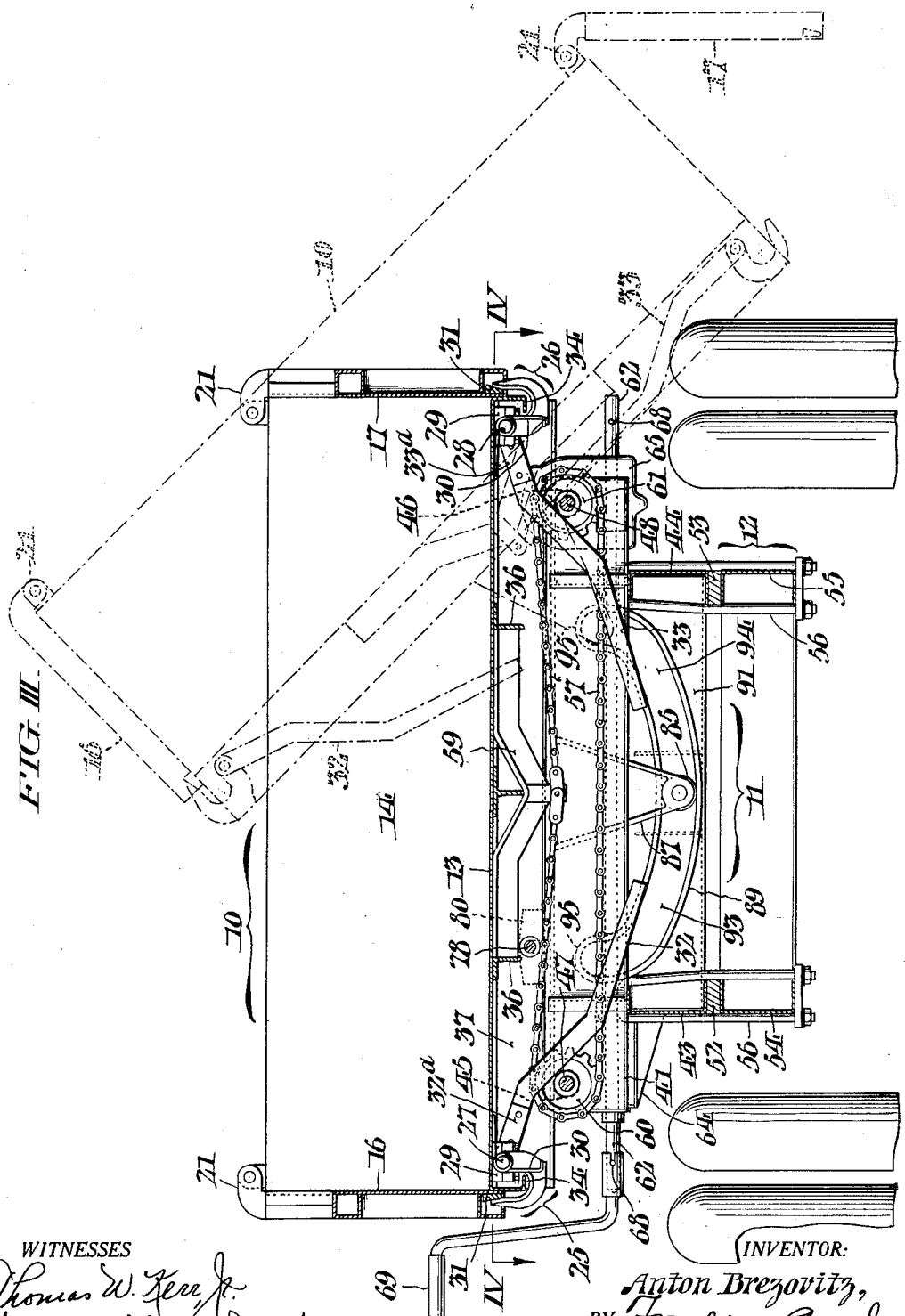

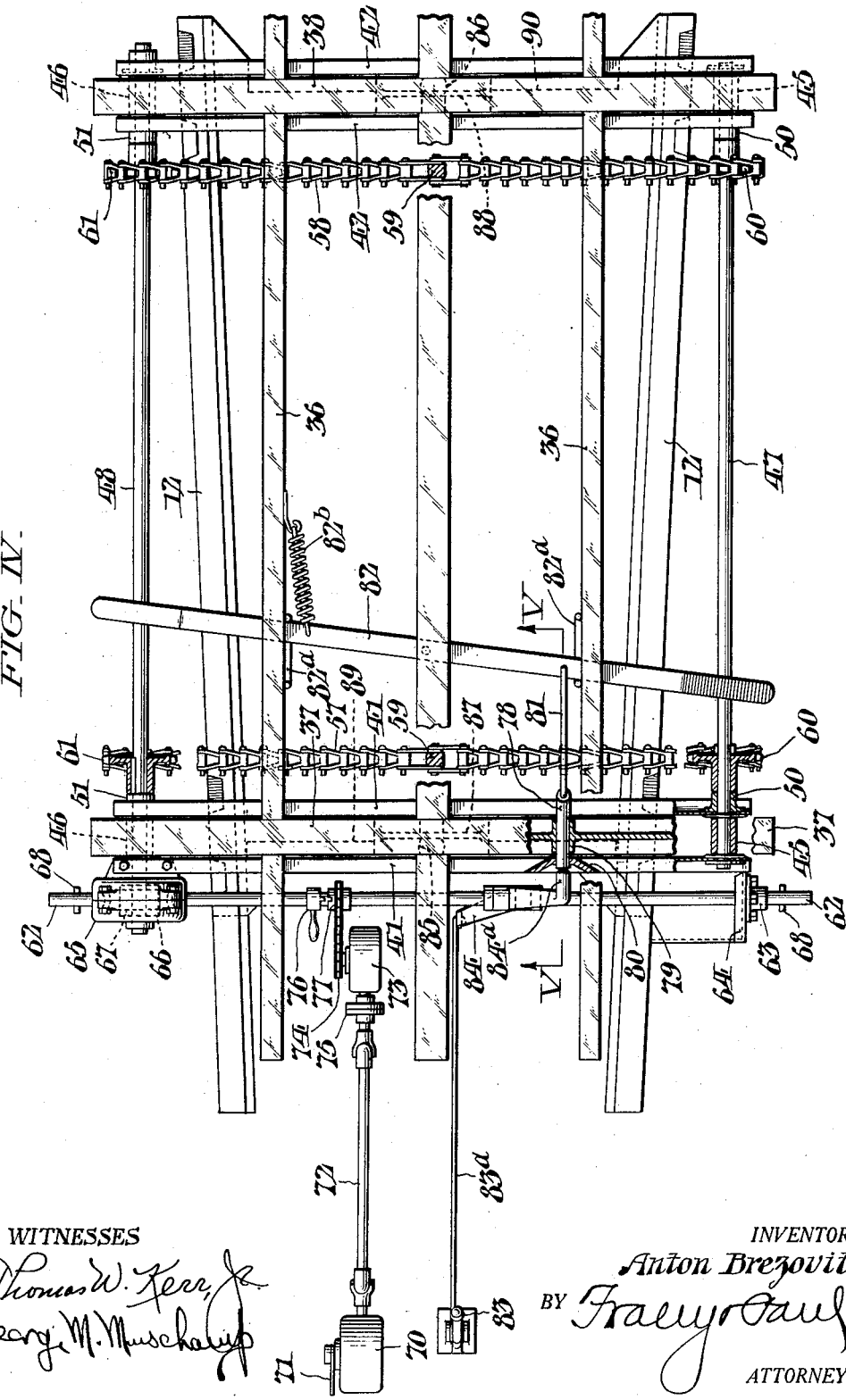

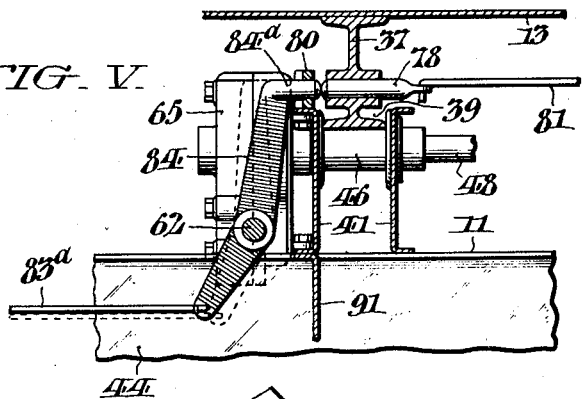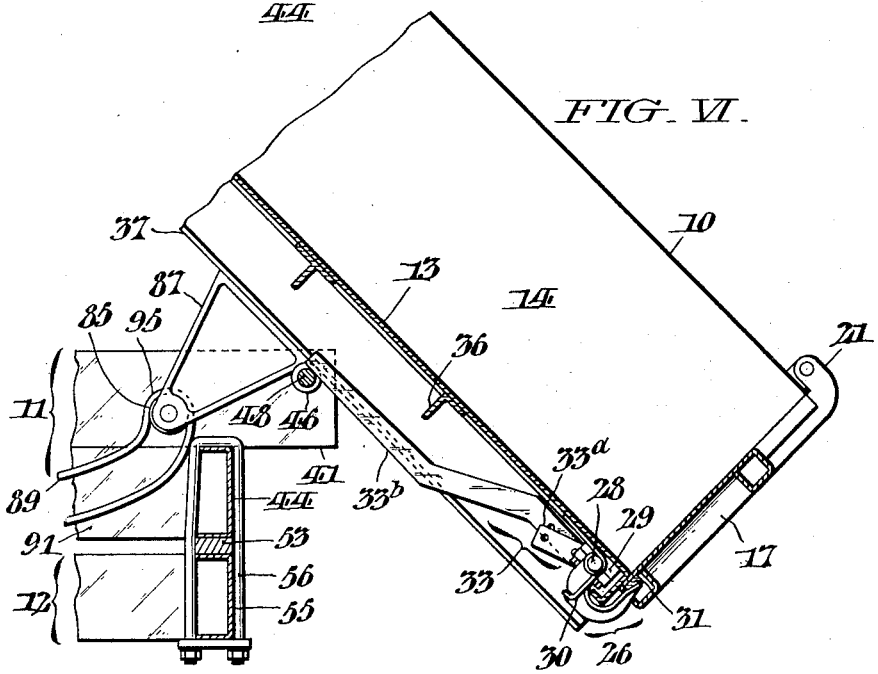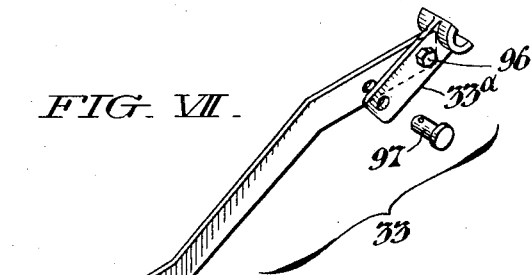

Patented Oct. 24, 1933

1,931,526

UNITED STATES PATENT OFFICE 1,931,526

DUMP BODY FOR VEHICLES

Anton Brezovitz, Coatesville, Pa., assignor to Best Body Corporation, Coatesville, Pa., a corporation of Pennsylvania Application October 13, 1930. Serial No. 488,265

5 Claims. (Cl. 298—13)

This invention relates to dump bodies for vehicles such as automobile trucks and the like, and has reference more particularly to dump bodies of the kind featured in U. S. Patent No. 1,608,923, granted to me on November 30, 1926, capable of lateral movement for discharge of the load to either side of the supporting chassis.

My present invention is in part directed toward provision, in connection with a dump body of the indicated type, of actuating means for progressively tilting the body concurrently with movement thereof horizontally of the chassis, thereby to equalize the effort necessary to operate the body and to predetermine gradual "rolling" over of the load incident to dumping with assurance against upsetting of the vehicle. A further advantage attributable to the actuating means aforesaid is that the body may be tilted to different angles so that dumping of portions of the load can be controlled at will.

Another object of my invention is to provide improved latch means which are automatically operated as the body is tilted, to release the side boards of the latter and permit them to swing open under the influence of gravity.

I also aim to provide facilities whereby the dump body may be operated under power as well as manually.

Still other objects and attendant advantages of this invention will be manifest from the following detailed description of the attached drawings, wherein Fig. I is a side elevation of the rear portion of an automobile truck fitted with my improved dump body, portions of said body being broken out and others shown in section to better illustrate important structural details.

Fig. II is a plan view of the body.

Fig. III is a cross sectional view taken as indicated by the arrows III—III in Figs. I and II.

Fig. IV shows a plan section taken as indicated by the arrows IV—IV in Figs. I and III.

Fig. V is a detail sectional view taken as indicated by the arrows V—V in Fig. IV and drawn to a larger scale.

Fig. VI is a fragmentary cross sectional view of the dump body in tilted position, showing the provisions made for preventing automatic release of the side boards of the body when desired; and, Fig. VII is a detail perspective view showing certain parts of the latch means for the side boards of the truck body.

As delineated in these illustrations, my invention comprises a truck body which is generally designated by the numeral 10, and a sub-frame 11 for supporting said body with capacity for movement horizontally to dumping position to either side of the truck chassis frame indicated at 12. For the sake of combined lightness and strength, the body 10 is preferably constructed throughout of sheet metal with a bottom 13, and front, tail and side boards 14, 15, 16 and 17 respectively. The front board 14 just referred to as well as rear corner posts indicated at 18, 19 in Figs. I and II are rigid with the bottom 13 of the body 10; while the tail and side boards 15, 16 and 17 are suspended for swinging movement by hinges 20 and 21 from the tops of the front board 14 and the corner posts 18, 19. Projecting laterally from the bottom corners of the tail board 15 are lugs 22 which normally occupy the bifurcations of brackets 23 secured to the corner posts 18, 19 at the bottom. Removable keeper pins 24 serve to retain the lugs 22 within the bifurcations of the brackets 23 and thereby lock the tail board 15 against opening. The side boards 16, 17 on the other hand, are normally held locked by latch members 25, 26 whereof there are in the present instance two for each side board. As shown in Fig. III these latch members are secured to rock shafts 27, 28 with journal support in bearing blocks 29 at the underside of the body bottom 13. Torsion springs 30 influencing the shafts 27, 28 serve to maintain the latch members 25, 26 in firm engagement with tapering wedge blocks 31 interiorly of the bottom edge hollows of the side boards 16, 17, and thereby prevent rattling. To enable retraction of the latch members 25, 26, as later on described, actuating arms 32, 33 are secured to the rock shafts 27, 28 respectively. The bottom 13 of the body 10 is stiffened along its lateral edges by integral depending channel flange formations 34, and at the ends by separately attached channels 35. Intermediate lengthwise beams 36, and a pair of I-beams 37, 38 extending crosswise between the flange formations 34, lend further strength to the body structure. The I-beams 37, 38 just referred to are confined to transverse guideways 39, 40 afforded by pairs of cross channels 41 and 42, that bridge the tops of the longitudinals 43, 44 of the sub-frame 11 near opposite ends. As shown in Figs. I and III the I-beams 37, 38 rest upon rollers 45, 46 which are constrained within the guideways 39, 40 but free to revolve on shafts 47, 48 extending lengthwise of opposite sides of the sub-frame 11 and journalled in bearings 50, 51. The rollers 45, 46 on their shaft axes 47, 48 not only reduce the frictional resistance to lateral movement of the body 10 relative to the chassis 12, but also afford lateral fulcra for the lateral tilting of the body, all as hereinafter described. Normally, however, the body 10 occupies a stable central position on the chassis 12 as shown in full lines in Fig. III, with its center of gravity (and that of its load) between the fulcra at 47, 48.

It will also be noted from Figs. I and III that the longitudinals 43, 44 of the sub-frame 11 rest, with interposition of strips 52, 53 of wood or other suitable cushioning material on the longitudinals 54, 55 of the chassis frame 12, whereto they are secured by U-bolts 56.

The means which I rely upon for moving the body 10 horizontally to one side or the other of the chassis includes a pair of endless chains 57, 58 which are attached to brackets 59 at the underside of the body bottom 13 and trained about coordinated sprocket wheels 60 and 61, respectively on the shafts 47, 48. For a reason which will presently become apparent, the sprockets 61, are keyed fast to the shaft 48 while the sprockets 60 are free on the shaft 47. A transverse operating shaft 62 has journal support adjacent one end in a bearing 63 bolted fast to a bracket 64 on one side of the sub-frame 11, and adjacent the other end in a gear housing 65 bolted fast to the foremost of the bridging channels 41, see Figs. III and IV. Within the housing 65 the operating shaft 62 has secured to it a worm 66 that meshes with a worm wheel 67 on the sprocket shaft 48 which also enters the housing. The projecting ends of the operating shaft 62 are fitted with key pins 68 to enable application thereto of a removable crank handle such as shown at 69 in Figs. I and III.

I also make provisions for moving the body 10 under power. These provisions are shown in Figs. I and IV as comprising a suitable clutch 70 adapted to be operated, by means of a hand lever 71, to connect an auxiliary transmission shaft 72 to the motor (not shown) of the vehicle. The power operating means further includes an enclosed speed reducing gear set 73, and a sprocket chain 74 whereby motion is communicated to the operating shaft 62. Interposed in the auxiliary power transmission shaft 72 is a slip coupling 75 to protect the parts against injury in the event that the operative fails to throw the clutch lever 71 after the body 10 has been moved to the full extent to one or the other side of the vehicle incident to dumping. By means of a supplemental hand operated clutch 76, the sprocket pinion 77 on the shaft 62 may be freed to permit manual operation of the latter by means of the hand crank 69 when desired or when required through failure of the power mechanism.

The body 10 is normally held against displacement on the chassis 12 by means of a bolt 78 which is slidable in a bearing boss 79 on the I-beam 37, and which engages an apertured bracket 80 secured to the sub-frame 11, see Figs. I and IV. The slide bolt 78 may be operated from either side of the vehicle by reason of a link connection 81 with a double ended lever 82 having fulcrum attachment at the center of the underside of the body bottom 13. The movement of the lever 82 is limited by stops 82a on the body 10; and a tension spring 82b effective on said lever functions to maintain the bolt 78 yieldingly engaged with the apertured bracket 80. The slide bolt 78 may also be operated by means of a hand lever 83 which is accessible from the driver's seat of the vehicle. As shown in Figs. I and IV, a link rod 83a connects the hand lever 83 with a rocker arm 84 which is free on the operating shaft 62 and formed at its upper end with a finger-like projection 84a to abut the contiguous end of the bolt 78. Movement of the hand lever 83 in the direction of the arrow in Fig. I is accordingly attended by displacement of the bolt 78 from the aperture in the bracket 80 as shown in Fig. V, and the body 10 thereby released for actuation by power under control of the hand lever 71.

Concurrently with horizontal movement of the body 10 to one side or the other of the chassis 12, bringing its center of gravity nearer and nearer the corresponding roller axes 47, 48, it is tilted through cooperation of rollers 85, 86 on arms 87, 88 depending centrally from its I-beams 37, 38, respectively, with cam tracks 89, 90 on the sub-frame 11, one or the other sets of the supporting rollers 45, 46 acting as rotary fulcrums at the time. The cam tracks 89, 90 are in the present instance, suitably fashioned from stout bar metal, and welded fast to flush vertical surfaces afforded jointly by one of each pair of the bridging channels 41, 42 and aligned subjacent channels 91, 92 extending crosswise of the sub-frame 11 in the plane of its longitudinals, see Fig. I. As best seen in Fig. III, the cam tracks 89, 90 embody mainly horizontal opposing but upwardly-curved portions 93, 94 which are symmetric with respect to the lengthwise axis of the sub-frame 11, and which terminate in mainly vertically-directed portions 95. Due to the described arrangement, it is evident that the tilting of the body 10 will be progressive and more and more rapid as it is moved sidewise on the chassis 12, since the cam tracks 89, 90 are curved upward in correlation with the approach of the center of gravity to the corresponding fulcra 45, 46. The load is thereby gently "rolled" over rather than thrown, with assurance against upsetting of the vehicle incident to dumping; and tilting of the body 10 is accomplished with equalization of the effort expended under either manual or power operation. From Fig. III it will be observed that the design of the cam tracks 89, 90 is such that the rollers 85, 86 on the depending arms 87, 88 of the body 10 enter the vertically-directed terminal portions 95 just as the gravity center of said body passes over the supporting rollers 45 or 46, as the case may be. The body 10 is thereby momentarily released to swing free, automatically, and comes to rest abruptly in an inclined dumping position, as exemplified in Figs. III and VI, with a slight jar as the rollers 85, 86 hit the tops of the terminal portions 95 of the cam tracks 89, 90. Such jarring obviously facilitates discharge of the load from the body 10 and is particularly effective in dislodging clinging materials like wet sand.

With initiation of the movement of the body 10 to the right as in Fig. III, the actuating arm 33 for the latch members 26 ride on the shaft 48, with attendant release of the side board 17 which thereupon opens automatically under the influence of gravity in preparation for discharge of the load in a manner obvious from the illustration. As the side board 17 swings and opens outward progressively with the progressive tilting of the body 10, the load is progressively discharged under the lower edge of the board 17. The opposite side board 16 will at this time remain closed and locked, since the actuating arm 32 for the latch members 25 recedes from the shaft 47. The converse of the foregoing takes place of course, when the body 10 is moved to the left in Fig. III.

Under certain conditions of practice, it may be preferable to keep the side boards 16, 17 of the body 10 latched incident to dumping. To this end the actuating arms 32, 33 for the latches 25, 26 are made in two parts 32a, 32b and 33a, 33b respectively, which parts, as best shown in Fig. VII, are pivotally connected permanently in each instance by a bolt 96, but normally held against independent movement by a supplemental locking pin 97. When this pin 97 is removed it is evident that the tail portion 33b of the arm 33 illustrated in Fig. VII is free to swing relative to the part 33a without inducing movement of the coordinated latches 26 as the body 10 is titled: i. e., the automatic release of the side board 17 as above set forth is prevented by removal of the pin 97. The side board 17 will therefore remain latched as shown in Fig. VI. Like reasoning will obviously hold for the actuating arm 32 associated with the latches 25 for the side board 16 of the body 10.

In instances where it is desirable that only portions of the load be dumped the body 10 may be tilted but part way under control of its actuating mechanism instead of through the maximum angle shown in Fig. III. This capacity of my improved truck is advantageous in that it permits, for example, distribution of stone or sand at intervals along a street curb until the load is exhausted. The advantage just indicated, as well as others previously mentioned, may obviously be realized in a flat top body with removable sides or stakes as well as with the automatic side board types specifically featured herein.

Having thus described my invention, I claim:

1. The combination with a motor vehicle chassis, of a dump body; mechanism beneath the body for moving it sidewise and for concurrently tilting it to discharge its contents, the said mechanism including an endless transversely arranged sprocket chain, and a closed loop symmetrically-disposed and upwardly curved cam track engaging a roller dependently-supported below the body; operating means for actuating the mechanism comprising a transverse shaft in gear coordination with a shaft carrying one of the sprockets for the chain aforesaid; and means whereby the transverse shaft aforesaid may be connected with the motor of the vehicle for power operation of the dump body actuating mechanism.

2. The combination with a vehicle chassis affording a lateral fulcrum, and a dump body having a side board mounted to swing and open outward and discharge the body contents under its lower edge, said body being normally stable on said chassis but movable laterally relative thereto, and also laterally tiltable relative thereto on said fulcrum, of means for moving said body laterally as aforesaid, thus bringing its center of gravity nearer and nearer the fulcrum, cam means for concurrently tilting the body against gravity curved in correlation with the approach of the center of gravity to the fulcrum so as to tilt the body more and more rapidly relative to its lateral movement as its center of gravity approaches the fulcrum, means for normally holding said side board against swinging outward as aforesaid, and means for automatically releasing said side board during the earlier lateral and tilting movement of the body, so as to permit progressive opening of the side board and discharge of the load as the body tilts.

3. The combination as set forth in the preceding claim including means for preventing automatic release of the side board as set forth in said claim.

4. The combination with a vehicle chassis affording a lateral fulcrum, and a dump body normally stable on said chassis but movable laterally relative thereto, and also laterally tiltable relative thereto on said fulcrum; of means for moving said body laterally as aforesaid, thus bringing its center of gravity nearer and nearer the fulcrum; and cam means, curved upward substantially in correspondence with the decrease in leverage of the gravity load about the fulcrum with the sidewise movement, for thereby tilting the body against gravity substantially throughout its sidewise movement at a rate of tilting increasing progressively substantially in correspondence with the decrease in leverage; so that by uniform effort the body may be moved sidewise at a substantially uniform rate, the progressively increasing rate of tilting being compensated by correspondingly diminishing resistance to tilting.

5. The combination with a vehicle chassis affording a lateral fulcrum, and a dump body normally stable on said chassis but movable laterally relative thereto, and also laterally tiltable relative thereto on said fulcrum, of means for moving said body laterally as aforesaid, thus bringing its center of gravity nearer and nearer the fulcrum; and cam slot means, curved upward substantially in correspondence with the decrease in leverage of the gravity load about the fulcrum with the sidewise movement, for thereby tilting the body against gravity substantially throughout its sidewise movement at a rate of tilting increasing progressively substantially in correspondence with the decrease in leverage, and then permitting substantially free automatic movement of the body after its center of gravity passes the fulcrum, followed by abrupt arrest at the end of the cam slot; so that by uniform effort the body may be moved sidewise at a substantially uniform rate until the point of free automatic movement is reached, the progressively increasing rate of tilting being compensated by correspondingly diminishing resistance to tilting.

ANTON BREZOVITZ.